US011140542B1

United States Patent
Palaniappan (10) Patent No.: US 11,140,542 B1
(45) Date of Patent: Oct. 5, 2021

(54) CROSS-PROVISIONING OF MOBILE DEVICE CAPABILITIES IN WIRELESS COMMUNICATION NETWORKS AND AN OTA SIM UPDATE

(71) Applicant: T-Mobile USA, Inc., Bellevue, WA (US)

(72) Inventor: Murugappan Palaniappan, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/000,100

(22) Filed: Aug. 21, 2020

(51) Int. Cl.
| | | |
|---|---|---|
| *H04W 8/18* | (2009.01) | |
| *H04W 8/24* | (2009.01) | |
| *H04W 4/24* | (2018.01) | |
| *H04L 29/12* | (2006.01) | |
| *H04W 8/26* | (2009.01) | |
| *H04W 12/06* | (2021.01) | |
| *H04W 92/02* | (2009.01) | |
| *H04W 84/04* | (2009.01) | |

(52) U.S. Cl.
CPC ......... *H04W 8/186* (2013.01); *H04L 61/6054* (2013.01); *H04W 4/24* (2013.01); *H04W 8/24* (2013.01); *H04W 8/26* (2013.01); *H04W 12/06* (2013.01); *H04W 84/042* (2013.01); *H04W 92/02* (2013.01)

(58) Field of Classification Search
CPC ......... H04W 8/186; H04W 4/24; H04W 8/26; H04W 12/06; H04W 8/24; H04W 92/02; H04W 84/042; H04L 61/6054
See application file for complete search history.

(56) References Cited

U.S. PATENT DOCUMENTS

| 2015/0126190 A1* | 5/2015 | Li | H04W 8/205 |
| | | | 455/436 |
| 2017/0127371 A1* | 5/2017 | Jiang | H04W 60/04 |
| 2019/0174299 A1* | 6/2019 | Ullah | H04L 63/102 |

* cited by examiner

*Primary Examiner* — Brandon J Miller
(74) *Attorney, Agent, or Firm* — Lee & Hayes, P.C.

(57) ABSTRACT

Systems and methods discussed herein are directed to enabling users to remain in a first network billing system but access a second network for wireless communication network services. This occurs via an OTA update of a user's UE SIM, where the update changes the primary public land mobile network (PLMN) from the first network to the second network. Additionally, the network capabilities for the UE are cross-provisioned from the first network to the second network, where the first network provides a service or rate plan to the second network.

20 Claims, 5 Drawing Sheets

CROSS-PROVISIONING OF MOBILE DEVICE CAPABILITIES IN WIRELESS COMMUNICATION NETWORKS AND AN OTA SIM UPDATE

BACKGROUND

When a wireless communication network operator (hereinafter referred to as a source network) merges or is bought out by another wireless communication network operator (hereinafter referred to as destination network), the typical process adopted in the wireless communication network industry is to migrate the subscribers from the source network to the destination network. At a high level, this can be categorized as a user migration. This migration process takes a long time because of the compatibilities that need to be the same or equivalent with respect to both network operators.

For example, one way for user migration is to port out users from the source network and port the users into the destination network, e.g., the users are migrated out of the source network completely. After such a port, the user now belongs to the destination network and receives billing, user care, and other services from the destination network. Such a port operation has a definite impact in terms of rate plans, associated costs, and user experience. Furthermore, such a port operation is generally very labor intensive and time consuming. In addition, the international mobile subscriber identity (IMSI) of the destination network needs to be on the user equipment so that the authentication and attachment to the destination network occurs automatically. Updating the IMSI on the user device impacts the user experience, is expensive, and time consuming.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture are described herein for cross-provisioning of service or rate plans between wireless communication networks and an over-the-air (OTA) update of subscriber identity modules (SIMs) for user equipment (UE). In particular, at a high level, the techniques may be categorized as user billing information migration from a source wireless communication network to a destination wireless communication network along with user network capabilities information migration from the source wireless communication network to the destination wireless communication network. However, the source network maintains the billing while the destination operator provides the network services to the UE.

Thus, the techniques described herein enable users to remain in the source network billing but access the destination network for services. This occurs via an OTA update of the user's UE SIM, where the update changes the primary public land mobile network (PLMN) from the source network to the destination network. Additionally, the network capabilities for the UE are cross-provisioned from the source network to the destination network, where the source network sends a service or rate plan to the destination network. Thus, the user network capabilities are migrated from the source network to the destination network behind the scenes and the UE is ready for auto-updating the user's billing operations to remain with the source network but using the destination network's capabilities for services. In configurations, if for some reason the user does not wish to have the auto-update, an opt-in process authorization from the user may allow for the updating of the SIM with the OTA update and the provision of the service or rate plan to the destination network.

Thus, if the auto-update or the opt-in authorization is considered a trigger, when triggered, the OTA update of the SIM is provided by an OTA server of the source network such that the primary wireless network on the SIM is the destination operator's network PLMN. Multiple opt-in triggers are possible. For example, a user may complain about poor coverage and may be told to go to a web page to give consent. Another example may involve using a source network operator's app, the user may opt-in to give consent. The source network operator may enable this option for all users whose service od rate plans are compatible. A further example may involve the source network operator sending all users whose service or rate plans are compatible an update requesting their consent. Another example may involve a user doing an upgrade to a compatible service or rate plan and is given the option. An additional example may involve a user adding a line, where the new line may automatically be provisioned to the destination network, if the user's existing lines are compatible, the user can give their consent to opt-in. A further example may involve a user walking into into a network store (for example to upgrade a UE) and if the user has a compatible service or rate plan, a sales representative may tell the user about the destination network capabilities and ask for the user's consent to switch. Other types of triggers are possible and the examples are not meant to be limiting. Also, based on the trigger, a cross-provision of the network capabilities for the UE is triggered between the source network and the destination network. In configurations, the OTA update may be provided by an OTA server of the destination network.

In particular, for example, at the source network, an OTA server, when triggered, updates the primary PLMN on a user's UE. The trigger, as previously noted, may be an auto-update or a specific authorization by the user. Additionally, the OTA server, or some other component of the source network, provides the authorized network capabilities for the UE at the source network to the destination network, e.g., a service or rate plan. Thus, the destination network is now aware of the authorized capabilities for the UE, e.g., data allowances, texting capabilities, phone call capabilities, etc. For example, the authorized capabilities may be consistent with a billing plan of the source network.

After the process, the UE of the user may connect to an eNodeB at the radio access network (RAN) of the destination network. The mobility management entity (MME) authenticates the UE with the home subscriber server HSS of the source network with respect to an IMSI range of IMSIs that are associated with the source network. The MME then checks with the domain name system (DNS) and based on tracking area code (TAC), connects the UE to the serving gateway (SGW) and packet data network (PDN) gateway (PGW) of the core network of the destination network. The MME then forwards the information to the destination network diameter routing agent (DRA), which routes the information to the destination network HSS. The access point name (APN) from the destination network HSS routes the UE to the destination network for receiving services.

Hence, the UE now operates within and receives service from the destination network, while the billing and other functions remain with the source network.

Accordingly, when two wireless communication networks merge, the user's UEs of a source network are migrated with respect to services and capabilities to a destination network, while the billing functions remain with the source network. In configurations, the techniques and architecture described herein may migrate their users to a destination operator's network quickly, e.g., almost instantaneously, at a low cost with minimal or no labor.

The techniques for such migration does not need to occur only when two wireless communication networks merge. For example, a first network may acquire a large number of users that desire Fifth Generation (5G) services, but the first network may determine that their network is inferior with respect to 5G services compared to a second network. Instead of risking losing the users to the second network, the first network may choose to keep the users in their billing system as first network users but enter into an agreement with the second network to use their network to offer better 5G services. Likewise, the techniques described herein may be useful with respect to virtual mobile network operators (VMNO).

Figure 1A:
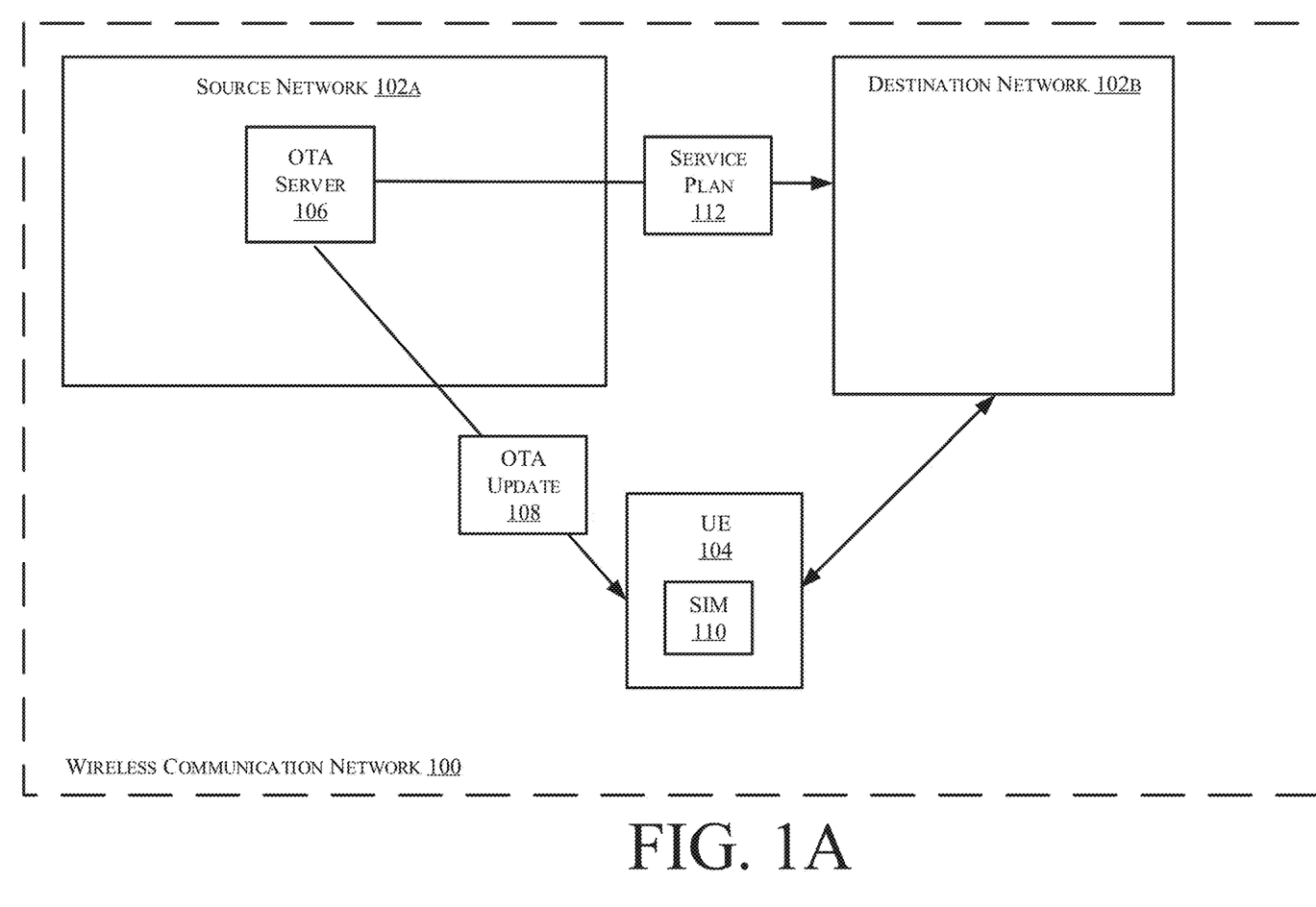
FIGS. 1A and 1B schematically illustrate a portion of an example wireless communication network that includes a source network and a destination network, in accordance with various configurations.
Figure 1B:
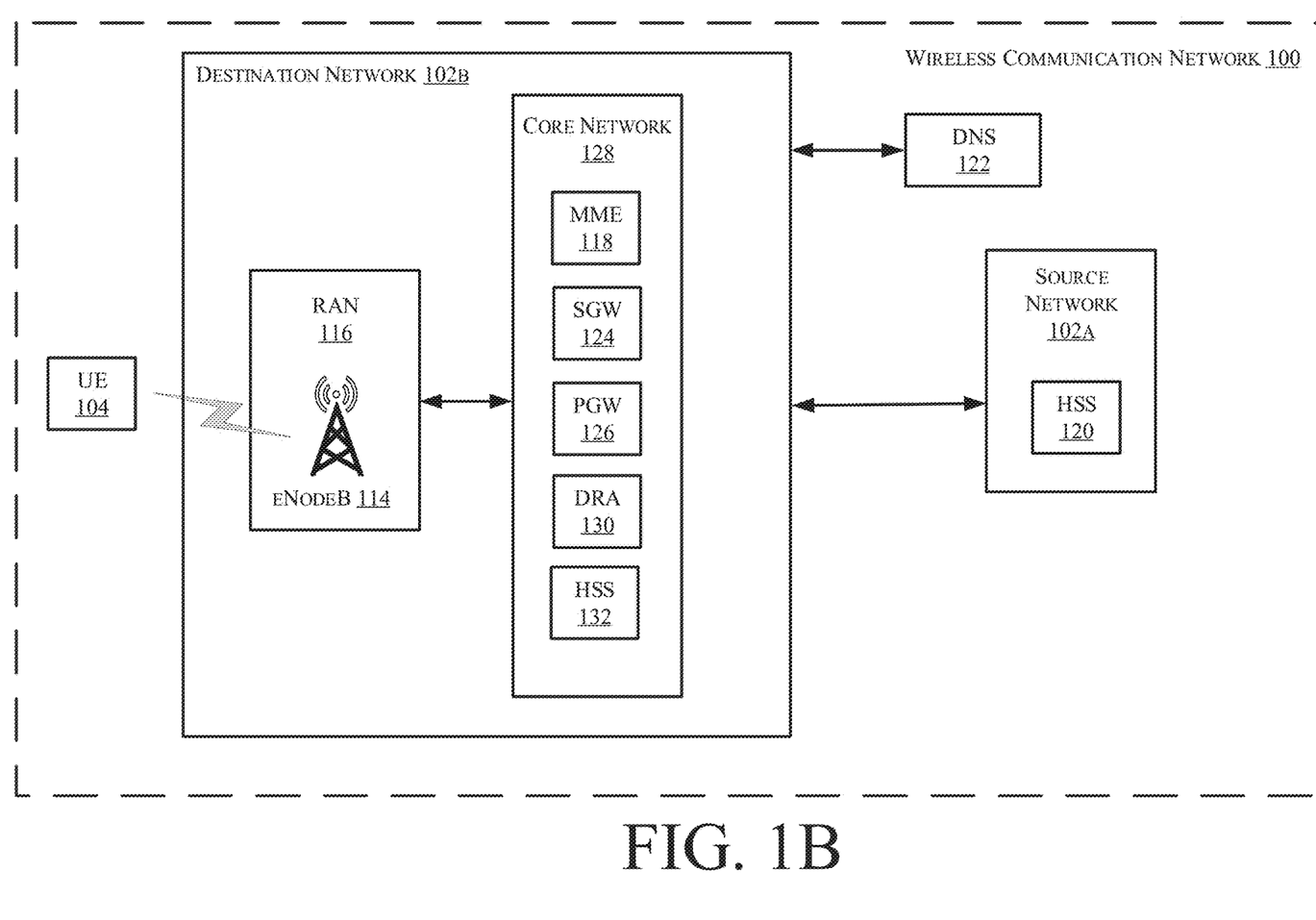

FIGS. 1A and 1B schematically illustrate a portion of an example wireless communication network 100. The wireless communication network 100 includes a source network 102 and a destination network 102b that are configured to operate according to one or more operating protocols. In the example, the operators of the source network 102a and the destination network 102b have merged to form the wireless communication network 100.

A user equipment (UE) 104 is configured to operate within the source network 102a and the destination network 102b according to one or more operating protocols. In configurations, the source network 102a, destination network 102b, and the UE 104 may be configured to operate according to one or more operating protocols including, but not limited to, Global System for Mobile Communications (GSM), Time Division Multiple Access (TDMA), Universal Mobile Telecommunications System (UMTS), Evolution-Data Optimized (EVDO), 3G, 4G, 5G, Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like.

The UE 104 may be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. In configurations, the UE 104 may be implemented as an Internet of things (IoT) device (also known as a machine-to-machine (M2M) device) configured to operate within the wireless communication network 100. Although this description predominantly describes the UE 104 as being "mobile" (i.e., configured to be carried and moved around), it is to be appreciated that the UE 104 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UE 104 may be capable of communicating over wired networks, and/or wirelessly using any suitable wireless communications/data technology, protocol, or standard, such as those mentioned above. As is known, there are generally numerous UEs 104 operating within the wireless communication network 100.

Referring to FIG. 1A, the source network 102a includes an over-the-air (OTA) server 106. When triggered, the OTA server 106 may provide an OTA update 108 that updates the primary PLMN on a SIM 110 of a UE 104. When changing the primary PLMN on the SIM 110, the PLMN associated with the source network 102a may be deleted or changed to a secondary PLMN. The secondary PLMN may be used when the primary PLMN is not available or is not providing adequate services. The trigger may be an auto-update as a result of the merger of source network 102a and destination network 102b, or a specific authorization by a user of the UE 104.

Additionally, when triggered, the OTA server 106, or some other component of the source network 102a, may provide the authorized network capabilities for the UE 104 at the source network 102a to the destination network 102a, e.g., a service or rate plan 112. Thus, the destination network 102b is now aware of the authorized capabilities for the UE 104, e.g., data allowances, texting capabilities, phone call capabilities, etc. For example, the authorized capabilities may be consistent with a billing plan of the source network 102a.

Accordingly, when the source network 102a merges with the destination network 102b, the OTA update 108 updates the UE's SIM 110, where the OTA update 108 changes the public land mobile network (PLMN) on the SIM 110 from the source network 102a to the destination network 102b. Additionally, the network capabilities for the UE 104 are cross-provisioned from the source network 102a to the destination network 102b, where the source network 102a sends a service or rate plan 112 to the destination network 102b. Thus, the user network capabilities are migrated from the source network 102a to the destination network 102b behind the scenes and the UE 104 is ready for auto-updating the user's billing operations to remain with the source network 102a but using the destination network's capabilities for services.

In configurations, if for some reason the user does not wish to have the auto-update, an opt-in process authorization from the user may serve as the trigger and allow for the updating of the SIM 110 with the OTA update 108 and the provision of the service or rate plan 112 to the destination network 102b. Multiple opt-in triggers are possible. For example, a user may complain about poor coverage and may be told to go to a web page to give consent. Another example may involve using a source network operator's app, the user may opt-in to give consent. The source network operator may enable this option for all users whose service od rate plans are compatible. A further example may involve the source network operator sending all users whose service or rate plans are compatible an update requesting their consent. Another example may involve a user doing an upgrade to a compatible service or rate plan and is given the option. An additional example may involve a user adding a line, where the new line may automatically be provisioned to the destination network, if the user's existing lines are compatible, the user can give their consent to opt-in. A further example may involve a user walking into a network store (for example to upgrade a UE) and if the user has a compatible service or rate plan, a sales representative may tell the user about the destination network capabilities and ask for the user's consent to switch. Other types of triggers are possible and the examples are not meant to be limiting.

Thus, if the auto-update or the opt-in authorization is considered a trigger, when triggered, the OTA update 108 of the SIM 110 is provided by the OTA server 104 of the source network 102a such that the primary PLMN on the SIM 110 is the PLMN of the destination network 102b. Also, a cross-provision of the network capabilities for the UE 104 is triggered between the source network 102a and the destination network 102b. In configurations, the OTA update 108 may be provided by an OTA server (not illustrated) of the destination network 102b.

Referring to FIG. 1B, after the process, the UE 104 may connect to an eNodeB 114 at a radio access network (RAN) 116 of the destination network 102b. A mobility management entity (MME) 118 authenticates the UE 104 with the home subscriber server (HSS) 120 of the source network 102a with respect to an IMSI range of IMSIs that are associated with the source network 102a. The MME 118 then checks with a domain name system (DNS) 122 and based on tracking area code (TAC), connects the UE 104 to the serving gateway (SGW) 124 and packet data network (PDN) gateway (PGW) 126 of the core network 128 of the destination network. The MME 118 then forwards the information to a destination operator diameter routing agent (DRA) 130, which routes the information to the destination operator HSS 132. The access point name (APN) from the destination network HSS 132 routes the UE 104 to the destination network for receiving services.

Hence, the UE 104 now operates within and receives service from the destination network 102b, while the billing and other functions remain with the source network 102a.

Accordingly, when two networks merge, the user's UEs of a source network are migrated with respect to services and capabilities to a destination network, while the billing functions remain with the source network. In configurations, the techniques and architecture described herein may migrate their users to a destination operator's network quickly, e.g., almost instantaneously, at a low cost with minimal or no labor.

The techniques for such migration does not need to occur only when two wireless communication networks merge. For example, a first network may acquire a large number of users that desire Fifth Generation (5G) services, but the first network may determine that their network is inferior with respect to 5G services compared to a second network. Instead of risking losing the users to the second network, the first network may choose to keep the users in their billing system as first network users but enter into an agreement with the second network to use their network to offer better 5G services. Likewise, the techniques described herein may be useful with respect to virtual mobile network operators (VMNO).

Figure 2:
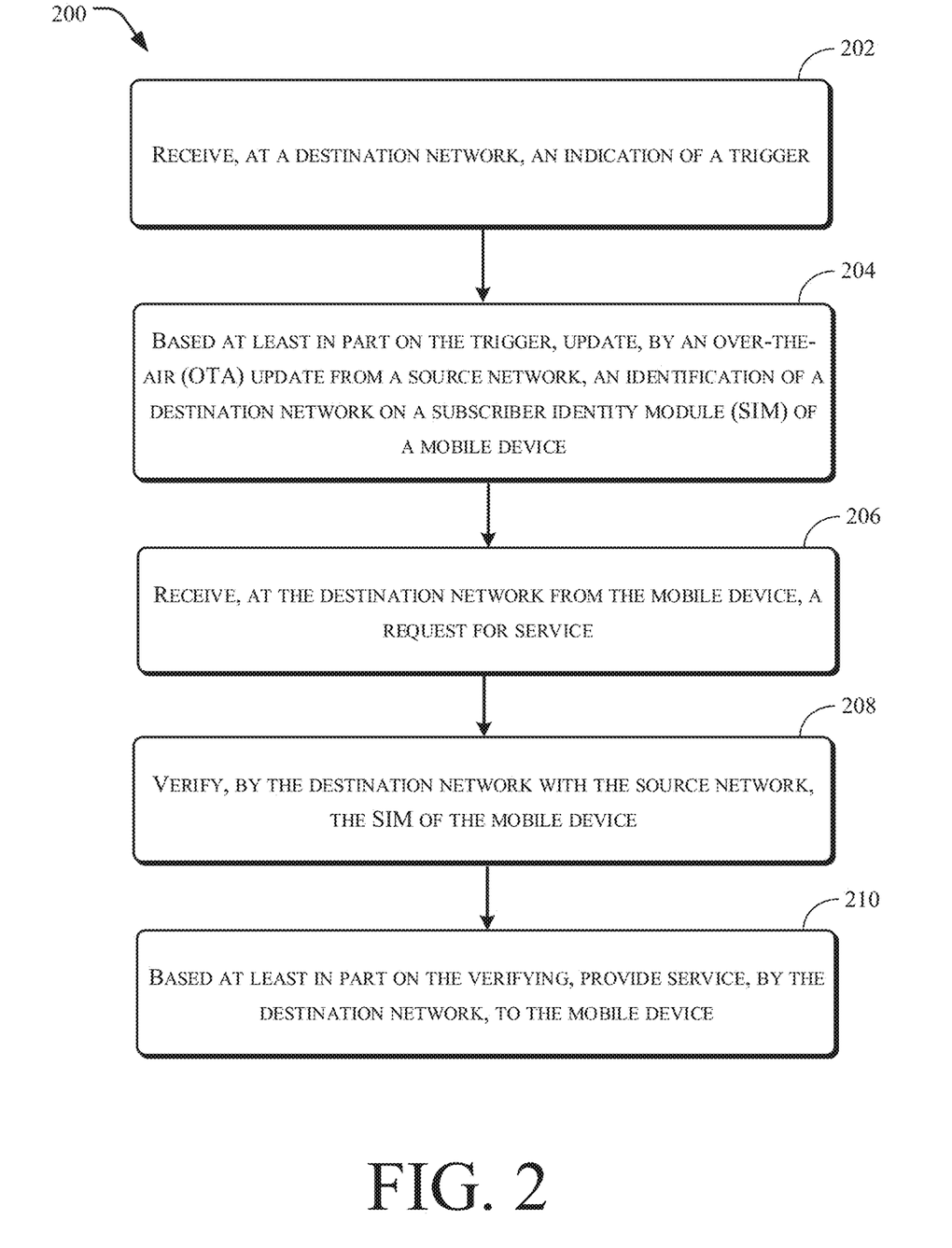
FIG. 2 is a flow diagram of an example process for an over-the-air (OTA) update of subscriber identity modules (SIMs) for user equipment (UE) of FIGS. 1A and 1B, in accordance with various configurations.

FIG. 2 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices FIG. 2 is a flow diagram of an example process 200 for is a flow diagram of an example process for an over-the-air (OTA) update of subscriber identity modules (SIMs) for user equipment (UE). At block 202, an indication of a trigger is received at a destination network. For example, the destination network 102b receives a trigger. At block 204, based at least in part on the trigger, an over-the-air (OTA) update from a source network updates an identification of a destination network on a subscriber identity module (SIM) of a mobile device. For example, the OTA server 106 sends an update 108 to a SIM 110 of UE 104 that updates the primary PLMN on the SIM to be the destination network 102b. At block 206, the destination network receives a request for service from the mobile device. For example, the UE 104 attempts to receive service from the destination network 102b. At block 208, the destination network verifies the SIM of the mobile device with the source network. For example, the destination network 102b verifies the IMSI on the SIM is within a range of IMSIs for the source network 102a. At block 210, based at least in part on the verifying, service is provided to the mobile device by the destination network. For example, service may be provided by the destination network 102b to the UE 104. In configurations, as previously noted, the billing remains with the source network 102a.

While the techniques and architecture described herein have been primarily described with respect to a wireless communication network, those skilled in the art will recognize that the techniques and architecture are equally applicable to other types of networks that utilize application pods and containers to provide services to various devices.

Figure 3:
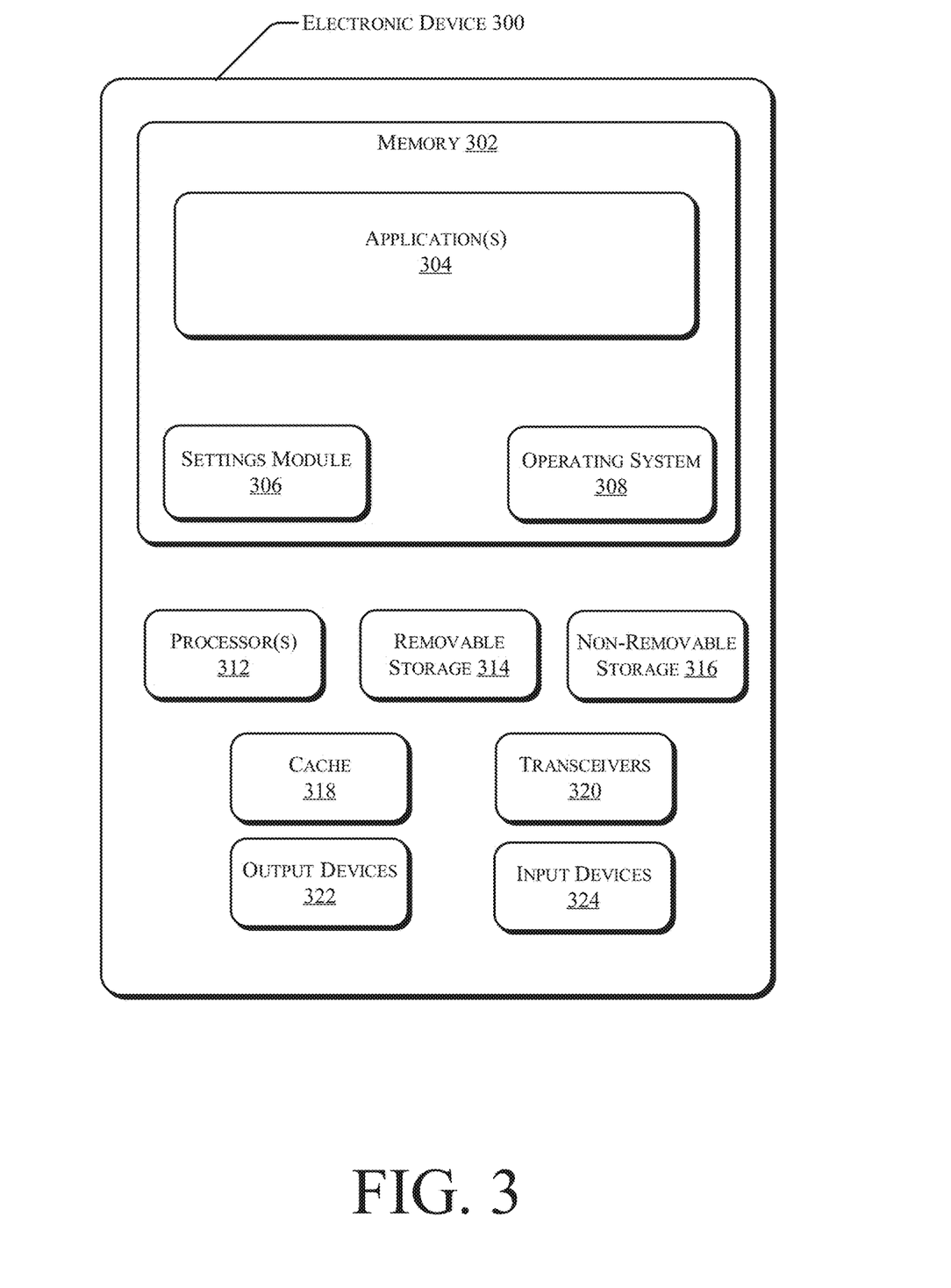
FIG. 3 schematically illustrates a component level view of an example electronic device configured for use in the wireless communication network of FIGS. 1A and 1b, in accordance with various configurations.

FIG. 3 schematically illustrates a component level view of an example electronic device 300, such as UE 104, configured to function within wireless communication network 100. The electronic device 300 may include more or less components depending on the type of electronic device. As illustrated, the electronic device 300 comprises a system memory 302, e.g., computer-readable media, storing application(s) 304. For example, the system memory 302 may include an application (app) configured to implement one or more functions with respect to RF signal level monitoring as described herein. The mobile device also comprises a settings module 306, and an operating system 308. Also, the electronic device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The electronic device 300 may also include additional data storage devices (removable and/or non-removable) such as, for example, magnetic disks, optical disks, or tape. Such additional data storage may include removable storage 314 and non-removable storage 316. Additionally, the electronic device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 300. Any such non-transitory computer-readable media may be part of the electronic device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the electronic device 300 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may various perform operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
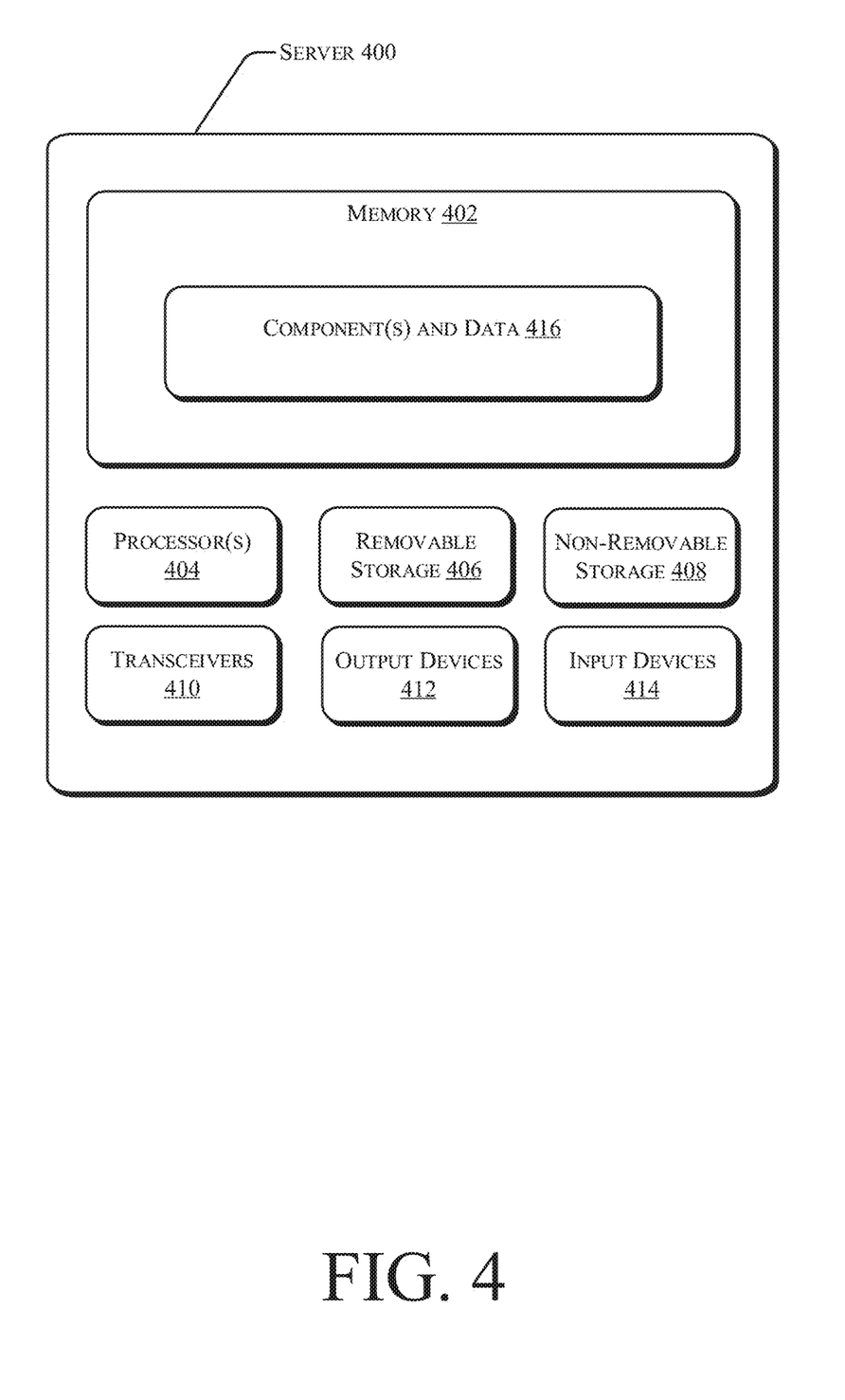
FIG. 4 schematically illustrates a component level view of a server configured for use in the wireless communication network of FIGS. 1A and 1B, in accordance with various configurations.

FIG. 4 illustrates a component level view of a server 400 configured for use within a wireless communication network, e.g., wireless communication network 100, in order to provide various services within the wireless communication network, according to the techniques described herein. For example, one or more servers 400 may be configured to implement one or more components of the source network 102a and/or the destination network 102b.

As illustrated, the server 400 comprises a system memory 402 that may store one or more components, modules, and/or applications and data 416 for interacting with electronic devices 300, e.g., UEs 104, or other electronic devices that may be configured as connected devices, as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.), or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead of, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 and memory 402 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1A, 1B, and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, at a destination network, an indication of a trigger;
based at least in part on the trigger, updating, by an over-the-air (OTA) update from a source network, an identification of a destination network on a subscriber identity module (SIM) of a mobile device;
receiving, at the destination network from the mobile device, a request for service;
verifying, by the destination network with the source network, the SIM of the mobile device; and
based at least in part on the verifying, providing service, by the destination network, to the mobile device.

2. The method of claim 1, further comprising:
receiving, by the destination network from the source network, a service plan of the mobile device, the service plan defining authorized capabilities for the mobile device in the source network.

3. The method of claim 2, wherein receiving the service plan occurs prior to the updating.

4. The method of claim 2, wherein receiving the service plan occurs based at least in part on the trigger.

5. The method of claim 1, wherein providing service, by the destination network, to the mobile device comprises providing service, by the destination network, to the mobile device while maintaining billing for the service with the source network.

6. The method of claim 1, wherein the verifying comprises verifying that an international mobile subscriber identity (IMSI) of the SIM is within a range of IMSIs of SIMs associated with the source network.

7. The method of claim 1, wherein updating the identification of the destination network on the SIM comprises changing a primary public land mobile network (PLMN) on the SIM from a PLMN associated with the source network to a PLMN associated with the destination network.

8. The method of claim 7, wherein changing the primary PLMN on the SIM comprises deleting the PLMN associated with the source network.

9. The method of claim 7, wherein changing the primary PLMN on the SIM comprises changing the PLMN associated with the source network to a secondary preferred PLMN.

10. The method of claim 1, wherein the trigger comprises at least one of auto-updating the SIM or an opt-in authorization associated with a user profile associated with the mobile device.

11. A non-transitory storage medium comprising instructions stored thereon, the instructions being executable by one or more processors to perform actions comprising:
receiving, at a destination network, an indication of a trigger;
based at least in part on the trigger, updating, by an over-the-air (OTA) update from a source network, an identification of a destination network on a subscriber identity module (SIM) of a mobile device;
receiving, at the destination network from the mobile device, a request for service;
verifying, by the destination network with the source network, the SIM of the mobile device; and
based at least in part on the verifying, providing service, by the destination network, to the mobile device.

12. The non-transitory storage medium of claim 11, further comprising:
receiving, by the destination network from the source network, a service plan of the mobile device, the service plan defining authorized capabilities for the mobile device in the source network.

13. The non-transitory storage medium of claim 11, wherein providing service, by the destination network, to the mobile device comprises providing service, by the destination network, to the mobile device while maintaining billing for the service with the source network.

14. The non-transitory storage medium of claim 11, wherein the verifying comprises verifying that an international mobile subscriber identity (IMSI) of the SIM is within a range of IMSIs of SIMs associated with the source network.

15. The non-transitory storage medium of claim 11, wherein updating the identification of the destination network on the SIM comprises changing a primary public land mobile network (PLMN) on the SIM from a PLMN associated with the source network to a PLMN associated with the destination network.

16. The non-transitory storage medium of claim 15, wherein changing the primary PLMN on the SIM comprises one of (i) deleting the PLMN associated with the source network or (ii) changing the PLMN associated with the source network to a secondary preferred PLMN.

17. The non-transitory storage medium of claim 11, wherein the trigger comprises at least one of auto-updating the SIM or an opt-in authorization associated with a user profile associated with the mobile device.

18. An apparatus comprising:
one or more processors; and
a non-transitory storage medium comprising instructions stored thereon, the instructions being executable by the one or more processors to cause the processors to perform one or more actions comprising:
receiving, at a destination network, an indication of a trigger;
based at least in part on the trigger, updating, by an over-the-air (OTA) update from a source network, an identification of a destination network on a subscriber identity module (SIM) of a mobile device;
receiving, at the destination network from the mobile device, a request for service;
verifying, by the destination network with the source network, the SIM of the mobile device; and
based at least in part on the verifying, providing service, by the destination network, to the mobile device.

19. The apparatus of claim 18, wherein providing service, by the destination network, to the mobile device comprises providing service, by the destination network, to the mobile device while maintaining billing for the service with the source network.

20. The apparatus of claim 18, wherein updating the identification of the destination network on the SIM comprises changing a primary preferred public land mobile network (PLMN) on the SIM from a PLMN associated with the source network to a PLMN associated with the destination network.

\* \* \* \* \*